Patented Nov. 22, 1949

2,488,590

UNITED STATES PATENT OFFICE 2,488,590

FLOWABLE CHLORINATED CAMPHENE COMPOSITION

John M. Evans, Oakland, Paul M. Ruedrich, Berkeley, and Virden A. Strom, Palo Alto, Calif., assignors to Griffin Chemical Company, a corporation of California No Drawing. Application May 15, 1948, Serial No. 27,368

9 Claims. (Cl. 167—30)

This invention relates to insecticidal preparations and particularly to the solubilization of chlorinated camphene to facilitate its use as an active principal in insecticidal dusts and sprays.

Chlorinated camphene has recently come into wide and accepted use. This material has the approximate empirical formula, $C_{10}H_{10}Cl_8$; in the grade usually employed for insecticidal purposes, it is a cream-colored, waxy solid, with a mild piney odor; it contains 67% to 69% chlorine, has a density of 1.6 and melts in the range of 65° C. to 90° C. It is extremely difficult to sub-divide into relatively finely divided form, and the usual method of formulation of insecticidal dusts, for example, has included heating of the chlorinated camphene to a temperature whereat it is sufficiently fluid and then spraying the hot material onto a finely divided carrier, such as talc. This is practical so long as the temperature of the chlorinated camphene remains sufficiently elevated above the solidification temperature of the chlorinated camphene, otherwise the spray nozzles clog and difficulty ensues. Chlorinated camphene does not melt sharply and give a mobile fluid at that temperature, but it is usually thought that it must be heated to approximately 120° C. for practical spraying results. At temperatures on this order, the substance is subject to loss of chlorine, which is another disadvantage.

According to another method, the chlorinated camphene is dissolved in kerosene, and the solution is then sprayed on a carrier. This is open to numerous objections and imposes various limitations on the use of the insecticide. The chlorinated camphene is extremely difficult to dissolve, even though it is quite soluble as measured by the amount which will finally go into solution. After spraying on the carrier, a large amount of solvent must be evaporated. Certain solvents, e. g. kerosene, may have heavy ends which will not evaporate, but will remain in the adsorbent carrier, to the detriment of the final product. Further, large amounts of such solvents as kerosene are necessary, practically not less than 20% of kerosene being used.

In the manufacture of insecticidal preparations to be applied as aqueous dispersions containing chlorinated camphene, other difficulties have also been encountered. For example, due to the sticky and gummy nature of the chlorinated camphene, it is practically impossible to have the material in finely divided form and to disperse it in a liquid in this form. The more usual method has been first to apply the material on a finely divided solid carrier which is thereafter dispersed in water. As a result, the composition, when applied, leaves a considerable residue of inactive material upon the fruit and vegetation. Also, the inert material present serves no useful purpose except as a carrier for the chlorinated camphene.

It is an object of our invention to provide a method of solubilizing chlorinated camphene so as to facilitate its employment as an active agent in insecticidal mixtures.

A further object is to provide an improved chlorinated camphene product having the physical characteristics of a liquid or semi-liquid at ordinary temperatures and thus increased availability for working up into emulsions, dusts, wettable dusts and diluted spray materials.

In accordance with the present invention, we have discovered that certain solvents for chlorinated camphene are readily soluble in chlorinated camphene and that a chlorinated camphene solution can be made up with one of these solvents with a relatively small concentration of the solvent present; in practical effect, so little of the added solvent need be employed that the addition merely amounts to a reduction of the viscosity of the chlorinated camphene to a point whereat the chlorinated camphene is a free-flowing liquid at atmospheric temperatures in the range of 30°–120° F. The term "solvent" is used in its general sense, that is, indicating a liquid in which chlorinated camphene may be dissolved, and not as indicating its function as a solute in our method and product. For example, we have found that hexane is soluble in chlorinated camphene and that as little as two parts by weight of hexane can be dissolved in 98 parts by weight of chlorinated camphene to provide a clear solution pourable at ordinary temperatures. The advantage of chlorinated camphene in liquid form will be instantly manifest to those skilled in the art, for it enables the chlorinated camphene to be applied readily to a finely divided solid inert carrier such as a talc, fuller's earth, pumice, diatomaceous earth, walnut shell flour or others. If desired, the liquid camphene can be readily converted into a water emulsion, suitable for spraying, by inclusion of a suitable emulsifier, mixing with the desired quantity of water to provide the final concentration of chlorinated camphene desired for application and agitating the mixture. Further, the liquid is easily diluted by any of the solvents customarily used, whether one of those hereinafter defined for our purposes, or others. Wettable dusts may easily be prepared by combining the product with an emulsifier prior to incorporating with the carrier. Increased uniformity of distribution of the emulsifier and of the wettable dust is attained.

Hexane is only exemplary and we have found that numerous other substances are soluble in the chlorinated camphene. We have found that an ordinary straight run gasoline can be utilized, as can acetone, pentane, toluene and many other hydrocarbons, halogenated hydrocarbons, and ketones, and mixtures of these substances which have the characteristics above defined. In case of a mixture, the factor for the mixture controls, and not the factors for the elements of the mixture.

On the other hand, however, not all solvents for chlorinated camphene are suitable. For example, benzene and carbon tetrachloride, both excellent solvents, are not useful for our purpose.

In an endeavor to ascertain what characteristics determine the usefulness of the solvents, a great many common solvents have been tested. As a result of these tests, we have found that the governing characteristic is a combination of the specific gravity and the viscosity of the solvent. The summation of these two characteristics may be given in the form of a factor obtained by adding the values for specific gravity and for viscosity at 20° C. expressed in centipoises. The factors so found for all useful solvents lie between 0.800 and 1.500. For example, hexane, a preferred solvent, has a specific gravity of 0.660 and a viscosity at 20° C. of 0.326 centipoises. The total of those two figures is 0.986. A product containing 5 parts by weight of hexane in 95 parts by weight of chlorinated camphene has a Saybolt Universal viscosity of 2355 seconds at 100° F. and 610 seconds at 130° F., and pours easily at 70° F. Acetone, with a specific gravity of 0.792 and a viscosity of 0.303, has a factor of 1.095. A solution of 5 weight percent of acetone in chlorinated camphene has Saybolt Universal viscosities at 100° F. of 2670 seconds and at 130° F. of 725 seconds.

Benzene is usually considered to be a good solvent for chlorinated camphene; it has a specific gravity of 0.880 and a viscosity in centipoises of 0.654 and its factor, therefore, is 1.534. The viscosity of a 5–95 mixture of benzene and chlorinated camphene at 130° F. cannot even be determined by the Saybolt method for the mixture will not flow. Actually, there is no substantial apparent physical difference between the chlorinated camphene per se and chlorinated camphene mixed with 5 weight percent of benzene, except for transparency of the latter. Benzene is not useful in the present invention. The same observation applies to carbon tetrachloride which has a specific gravity of 1.595 and a viscosity at 20° C. of 0.975 centipoise, a total of 2.570.

As is indicated, heat rapidly reduces the viscosity of the mixture. All such process steps as heating, diluting, spraying, emulsifying, etc., are greatly facilitated by comparison with these same steps applied to the un-solubilized chlorinated camphene.

A further advantage, where the solvent used has a low flash point, is that due to the extremely small quantities of solvent employed, the final product is of sufficiently high flash-point that it may be shipped by freight without the red label indicating dangerous inflammability. For example, hexane with a flash point of −28° F. may be dissolved in chlorinated camphene at 5% by weight. The flash point of the resultant product is 108° F., well above the 80° F. limit.

It is a feature of the present invention that the solvents utilized, in effect, merely provide for liquefaction of the chlorinated camphene without heating of the mixture and that the camphene is in a liquid or semi-liquid state at ordinary atmospheric temperatures, thus enabling it to be applied to solid carriers or to be emulsified readily, as has been indicated above. Because so little of the added solvent is present, it may be permitted to remain, if desired, in the emulsion or on the solid inert carrier. The solvent will not interfere with the stability of the emulsion, or exhibit an undesirable phytotoxicity in use. It adds little to the shipping weight.

As presently contemplated, the preferable manner of practicing our invention is to incorporate the solvent at the time of producing the chlorinated camphene. According to the present usage, the chlorinated camphene is obtained in a final step in a molten condition. The solvent may conveniently be added at this time, and the final product, containing, say, 5% of the solvent, will be a readily manipulable liquid rather than a waxy solid requiring special equipment and techniques to handle at all, and almost impossible to work with in the field.

We claim:

1. A chlorinated camphene product liquid at ordinary atmospheric temperatures and consisting of from 90 to 98 parts by weight of chlorinated camphene in which is dissolved from 2 to 10 parts by weight of a solvent for chlorinated camphene, total weight of the product being 100 parts, the solvent being one the sum of whose (1) specific gravity and (2) viscosity at 20° C. in centipoises is within the range from about 0.800 to 1.500.

2. A product liquid at ordinary atmospheric temperatures and consisting of from 90 to 98 parts by weight of chlorinated camphene in which is dissolved from 2 to 10 parts by weight of acetone, the total weight being 100 parts.

3. A product liquid at ordinary atmospheric temperatures and consisting of from 90 to 98 parts by weight of chlorinated camphene in which is dissolved from 2 to 10 parts by weight of hexane, the total weight being 100 parts.

4. A product liquid at ordinary atmospheric temperatures and consisting of from 90 to 98 parts by weight of chlorinated camphene in which is dissolved from 2 to 10 parts by weight of toluene, the total weight being 100 parts.

5. A product liquid at ordinary atmospheric temperatures and consisting of about 5 parts by weight of acetone dissolved in about 95 parts by weight of chlorinated camphene.

6. A product liquid at ordinary atmospheric temperatures and consisting of about 5 parts by weight of hexane dissolved in about 95 parts by weight of chlorinated camphene.

7. A product liquid at ordinary atmospheric temperatures and consisting of about 5 parts by weight of toluene dissolved in about 95 parts by weight of chlorinated camphene.

8. A chlorinated camphene product liquid at ordinary atmospheric temperatures and consisting of from 90 to 98 parts by weight of chlorinated camphene in which is dissolved from 2 to 10 parts by weight of an aliphatic hydrocarbon solvent for chlorinated camphene, the total weight of the product being 100 parts, the solvent being one the sum of whose (1) specific gravity and (2) viscosity at 20° C. in centipoises is within the range from about 0.800 to 1.500.

9. A chlorinated camphene product liquid at ordinary atmospheric temperatures and consisting of from 90 to 98 parts by weight of chlorinated camphene in which is dissolved from 2 to 10 parts by weight of an aromatic hydrocarbon solvent for chlorinated camphene, the total weight of the product being 100 parts, the solvent being one of the sum of whose (1) specific gravity and (2) viscosity at 20° C. in centipoises is within the range from about 0.800 to 1.500.

JOHN M. EVANS.
PAUL M. RUEDRICH.
VIRDEN A. STROM.

REFERENCES CITED

The following references are of record in the file of this patent:

UNITED STATES PATENTS

| Number | Name | Date |
| --- | --- | --- |
| 2,351,583 | Boissonou et al. | June 20, 1944 |
| 2,404,913 | Leiserson | July 30, 1946 |
| 2,420,295 | Biehn et al. | May 13, 1947 |

OTHER REFERENCES

Chem. and Engr. News, Oct. 6, 1947, page 2926.